3,449,952
DROP-COUNT ATTACHMENT

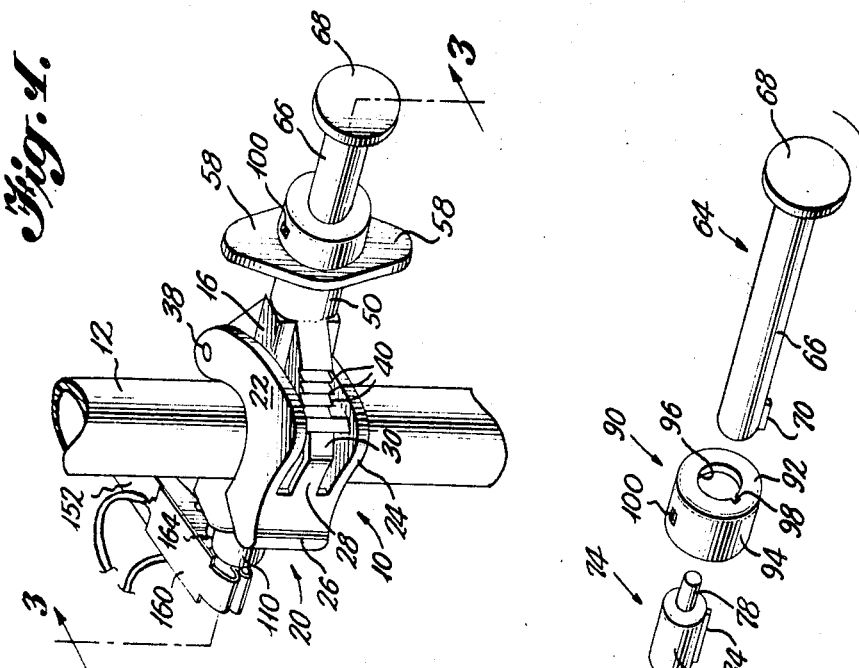
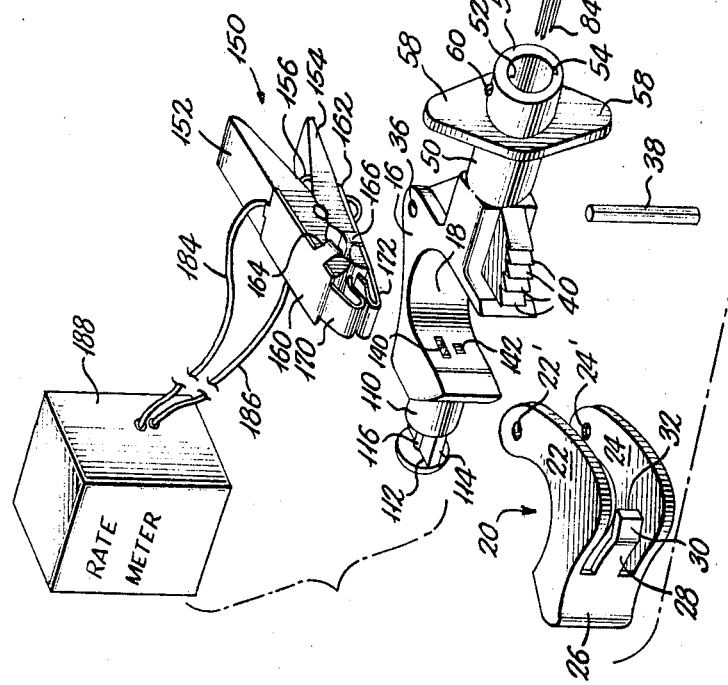

Malcolm Neal Brown, Camp Hill, Pa., Thomas Sewell Hargest III, Charleston, S.C., and Herbert Collier Stoltz, Hershey, Pa., assignors to AMP Incorporated, Harrisburg, Pa.
Filed May 19, 1967, Ser. No. 639,901
Int. Cl. G01f 1/04
U.S. Cl. 73—194                    11 Claims

ABSTRACT OF THE DISCLOSURE

A drop-count attachment apparatus which measures drops flowing in a tube. The attachment includes a body means having a recess for receiving the tube. A plunger having three electrodes at its end is slidably mounted in the body means, and an electrical contact is also mounted on the body means in communication with the recess. The plunger may be slid so as to allow the electrodes to pierce the tube and be received by the contact means located across the recess.

Background of the invention

The present invention relates to an attachment for attaching a fluid flow meter to a tube through which drops of fluid pass in order to measure the number of drops passing through the tube.

The invention is adapted for use in medical applications such as measuring the number of drops passing through a tube used intravenous injections into the human body where it is necessary to accurately record the total number of drops. The attachment of the present invention is adapted to be used in conjunction with a suitable rate measuring meter as shown for example in copending U.S. patent application Ser. No. 543,246.

Attachments according to the present invention include electrodes which puncture and extend within the associated tube. Drops passing through the tube come in contact with these electrodes and alter the impedance therebetween. This change in impedance is detected by the circuit of the associated meter which is electrically connected with the electrodes to provide the desired measurement.

Prior art attachments of this nature have been difficult to effectively mount in operative position with the electrodes puncturing the walls of the associated tube and extending therewithin. Additionally, prior art attachments have not provided means which is readily accessible for connecting and disconnecting external electrical leads therewith.

Prior art attachments generally provide some sort of means for holding the attachment in operative position, but this means is often difficult and awkward to use.

Summary of the invention

The attachment of the present invention provides an arrangement whereby the attachment may be easily mounted about a tube with the electrodes piercing the walls of the tube and extending therethrough and making contact with contact means including externally exposed portions which are readily accessible for attaching external leads thereto.

The clamping means of the present invention provides a readily operated means for securely maintaining the attachment in operative position on a tube and detent mechanism is provided for holding the clamping means in adjusted position.

A particular advantage of the present invention is the fact that the various components thereof are assembled as a unit thereby facilitating sterilization, shipping and handling by those who use the attachment.

Additionally, the electrodes of the attachment are protected by a surrounding portion of the attachment prior to use and insertion of the electrodes within an associated tube.

Furthermore, the electrodes provide a sealed connection to the external circuit, and are so arranged as to effectively sense drops when the associated tube is slightly inclined with respect to vertical.

An object of the present invention is to provide a new and novel drop-count attachment which may be easily mounted in operative position relative to an associated tube and securely maintained in clamped position thereon; and further wherein means is provided for readily attaching external electrical leads thereto; and wherein the arrangement is quite simple and inexpensive as well as lightweight and compact in construction and yet at the same time is quite sturdy and reliable in use.

Brief description of the drawings

FIG. 1 is a top perspective view illustrating the attachment of the present invention mounted in operative position on an associated tube;

FIG. 2 is an exploded perspective view illustrating the attachment of the present invention as well as means for connecting external leads thereto;

Description of the preferred embodiment

Figure 3:
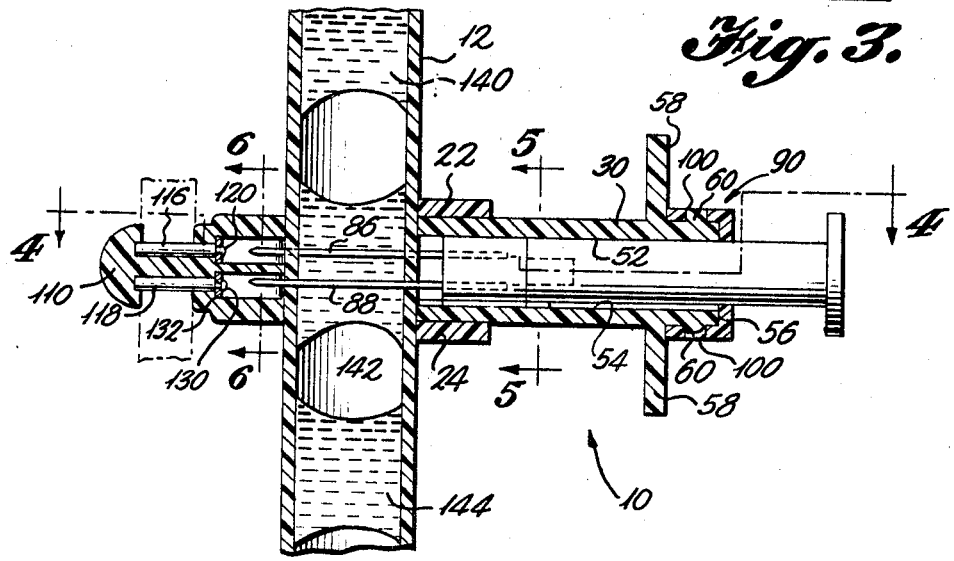
FIG. 3 is a sectional view taken substantially along line 3—3 of FIG. 1 looking in the direction of the arrows.

Referring now to the drawings wherein like reference characters designate corresponding parts throughout the several views, the attachment according to the present invention is indicated generally by reference numeral 10 as being operatively mounted upon a tube 12. The tube 12 may be a conventional plastic tube or the like as used for example in intravenous feeding techniques. The tube 12 will be disposed substantially vertically at the point where the attachment is mounted, and drops of fluid passing downwardly through the tube will be measured by the attachment as hereinafter described.

As seen most clearly in FIG. 2, the attachment includes a body means 16 formed of a suitable plastic such as nylon or the like, this body means including a recess 18 formed therein for receiving the tube therewithin.

A clamping means is indicated generally by reference numeral 20 and includes a pair of spaced arms 22 and 24 having holes 22' and 24' respectively formed therethrough. The opposite ends of these arms are interconnected by an integral connecting portion 26.

Figure 4:
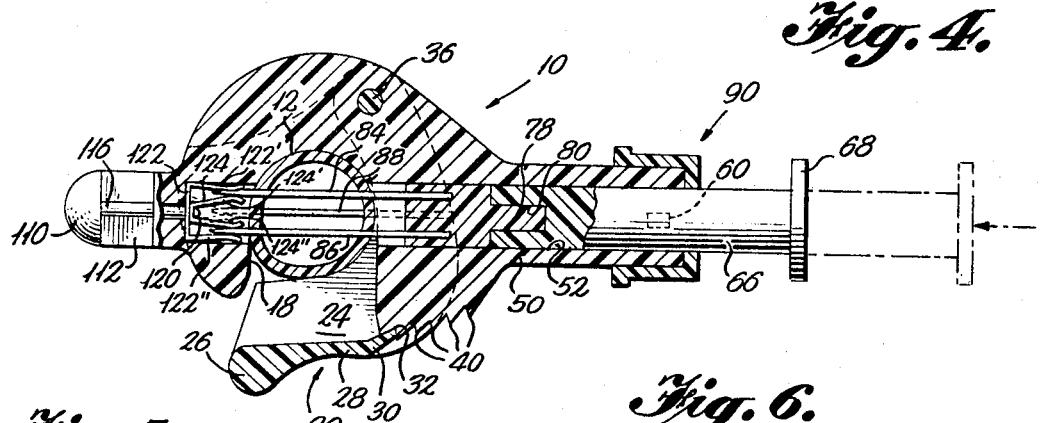
FIG. 4 is a sectional view taken substantially along line 4—4 of FIG. 3 looking in the direction of the arrows.
Figure 5:
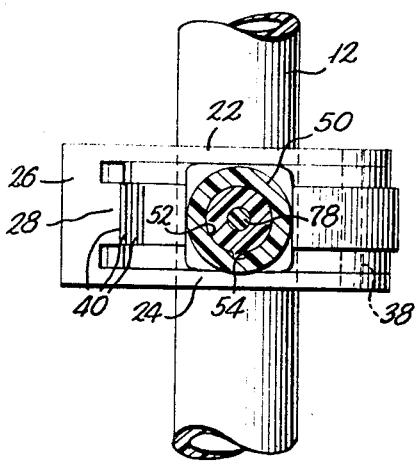
FIG. 5 is a sectional view taken substantially along line 5—5 of FIG. 3 looking in the direction of the arrows.

A finger portion 28 extends from portion 26 and is spaced centrally between the two spaced arms 22 and 24. Finger portion 28 includes an angularly disposed end portion 30 which terminates in a sharp edge portion 32 adapted to engage ratchet teeth formed on the body means as hereinafter described. The construction is such that the finger portion is resilient and will normally be inherently biased so that the edge portion 32 thereof will be urged into engagement with the aforementioned ratchet teeth. The end portion 30 of finger portion 28, as seen most clearly in FIG. 4, extends inwardly of the outer edges of arms 22 and 24 thereby preventing accidental displacement and discouraging purposeful displacement of the finger portion from its operative locking position as hereinafter described.

The body means is provided with a hole 36 formed therethrough which receives a pin 38, the opposite ends of pin 38 being tightly fitted within the holes 22' and 24' so as to swingably support the clamping means on the body means.

The body means has formed thereon a plurality of integral ratchet teeth 40 which are interengageable with the outer sharp edge 32 of the resilient finger portion on the clamping means. As seen most clearly in FIG. 4, when a tube 12 is inserted within the recess 18 in the body means, the clamping means is then swung downwardly into the clamping position illustrated so as to tightly clamp the attachment on the tube. The resilient finger portion will move down over the ratchet teeth until it locks into position on one of the teeth to hold he clamping means and the attachment securely in the adjusted operative position.

The body means includes an integral tubular portion 50 having a bore 52 formed therethrough. A longitudinally extending slot 54 is formed in the body means in communication with the bore 52. Bore 52 and slot 54 extend completely through the tubular portion to open at one end into the recess 18 and at the opposite end through the end portion 56 of the tubular portion.

A pair of integral laterally extending finger grip portions 58 are formed on the tubular portion and extend from substantially diametrically opposite sides thereof. In addition, a pair of integral ears 60 are formed at diametrically opposite portions of the tubular portion and extend outwardly there therefrom, these ears sloping inwardly toward the outer end 56 of the tubular portion as seen most clearly in FIG. 3 for a purpose hereinafter described.

A plunger means includes a first portion indicated generally by reference numeral 64 and including a substantially cylindrical portion 66 having an enlarged head 68 formed at one end thereof. A longitudinally extending radially outwardly projecting key 70 is formed at the end of the portion 64 opposite to the enlarged head portion 68. This key 70 is adapted to be slidably disposed within the slot 54 formed in the tubular portion of the body means.

The plunger means includes a second portion indicated generally by reference numeral 74, this second portion comprising a removable tip portion having a generally cylindrical body means 76 of the same outer dimension as the cylindrical body portion 66 previously described. A reduced cylindrical portion 78 extends from body portion 76, this reduced portion being received within a socket 80 formed in the end portion of body portion 66 as seen most clearly in FIG. 4. Portion 78 fits snugly within socket portion 80 so that the tip portion and the remaining portion 64 of the plunger means move as a unit into operative position.

A longitudinally extending key 84 projects radially outwardly of the body portion 76 of plunger portion 74, this key being adapted to be aligned with key 70 formed on this other plunger portion and to be slidably disposed within the slot 54 in the tubular portion of the body means.

Three spaced metallic electrodes 84, 86 and 88 are supported by body portion 76 and have sharp outer tip portions for piercing an associated tube. All of the parts described previously to these electrode members are preferably formed of plastic, while the electrode members are formed of a suitable electrically conductive metallic substance.

A cap indicated generally by reference numeral 90 includes and end wall 92 of generally circular configuration having a peripheral flange 94 extending therefrom. A hole 96 is formed centrally through end wall 92 and is adapted to slidably receive the body portion 66 of the plunger means. A slot 98 formed in end wall 92 is in communication with hole 96 and is adapted to receive the key 70 on body portion 66 of the plunger means when the plunger means is initially assembled through hole 96 in the cap.

The flange portion 94 of the cap has a pair of diametrically opposite holes 100 formed therethrough, these holes being adapted to receive the ears 60 previously described.

When assembling the plunger means with respect to the body means, the portion 64 of the plunger means is firstly inserted through the cap and the tip portion 74 secured to portion 64 of the plunger means. The two portions 64 and 74 of the plunger means are then inserted within the tubular portion of the body means with the keys 84 and 70 slidably received within slot 54 of the tubular portion. The cap 90 is then moved downwardly into the assembled position shown most clearly in FIG. 3 wherein it is forced over the tapered ears 60 until the ears snap into place within the holes 100 formed in the cap whereupon the cap is permanently affixed to the body means. When the cap is in the assembled position, the slot 98 in the cap is displaced 90 degrees from the slot 54 in the tubular portion of the body means so that the plunger means cannot be withdrawn from the apparatus.

The body means includes an integral post portion 110 extending therefrom, this post portion being cutaway at 112 and 114, a pair of contact pins 116 and 118 being supported within suitable portions of the post portion and being exposed at the cutout portions 112 and 114 respectively for engagement by a clip assembly hereinafter described.

One end of contact pin 116 is connected by a rivet 120 with a pair of U-shaped electrically conductive portions 122 and 124. Portion 122 defines spaced resilient members 122' and 122", and portion 124 defines spaced resilient members 124' and 124". As seen most clearly in FIGS. 4 and 6, members 122' and 124' are adapted to receive electrode 84 therebetween, and members 122" and 124" are adapted to receive electrode 86 therebetween.

Figure 6:
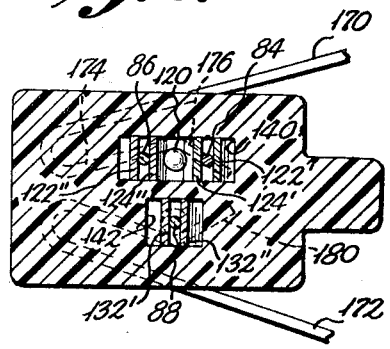
FIG. 6 is a sectional view on an enlarged scale taken substantially along line 6—6 of FIG. 3 looking in the direction of the arrows.

The upper end of pin 118 is connected by a rivet with a single U-shaped portion 132 which as seen in FIG. 6 includes spaced resilient members 132' and 132" adapted to receive therebetween electrode 88. It will of course be understood that pins 116 and 118 are formed of electrically conductive material, and that the resilient contact portions thereof are adapted to resiliently receive the various electrodes to provide a good electrical interconnection therewith.

The assembled position of the apparatus relative to a tube is seen most clearly in FIG. 3 wherein a plurality of spaced drops of a suitable fluid are indicated by reference numerals 140, 142 and 144. As illustrated, drop 142 is in interengagement with the various electrodes to thereby change the impedance therebetween to cause operation of the associated circuit to detect the passage of this drop through the tube. It is apparent that an electrical connection is provided from the electrodes to the two contact pins 116 and 118, electrodes 84 and 86 being connected with pin 116, and electrode 88 being connected with pin 118.

It will be noted as seen in FIGS. 2 and 6 that the resilient contact members 122', 122", 124' and 124" are disposed within a recess 140 disposed within the body means, while the resilient contact members 132' and 132" are disposed within a recess 142 formed in the body means. These two recesses 140 and 142 open into the recess 18 defined in the body means so that when the device is in the operative position shown in FIG. 3, the electrodes will be adapted to enter between the associated resilient contact portions.

It will be understood that the apparatus is first clamped in position on a tube by means of the clamping means 20, whereupon the plunger means is forced inwardly into the body means into the operative position shown in FIG. 3.

It will be noted that the electrodes 84, 86 and 88 are protected prior to use since the plunger means and the associated electrodes are initially positioned such that the electrodes are disposed entirely within the bore and are surrounded by tubular portion 50.

Electrodes 84 and 86 are of one polarity, while electrode 88 is of the opposite polarity relative to the associated electrical circuit. Electrodes 84 and 86 are so positioned relative to electrode 88 as to sense the passage of drops through an associated tube even when the tube has a slight inclination with respect to vertical.

The electrodes are also so constructed and arranged as to provide a sealed connection to the external associated electrical circuit, thereby enhancing the sterility of the over-all arrangement.

After the electrodes have been moved into operative position piercing the walls of an associated tube, withdrawal of plunger portion 64 will not cause withdrawal of plunger portion 74 since portion 78 will pull out of socket 80. It is intended that once the attachment has been placed on a tube and used for a particular patient, it will be thrown away with the tube.

Referring now to FIGS. 1 and 2, a contact clip assembly is indicated generally by reference numeral 150 and may comprise a commercial plastic clothespin including separate leg portions 152 and 154 mounted for pivotal movement with respect to one another and having a spring means 156 interconnected therewith for normally urging the left-hand ends of the arms toward one another as seen in the figures.

This clothespin is modified for the purpose of the present invention by providing two thin sheets of copper 160 and 162 on leg portions 152 and 154 respectively, these sheets having integral tabs 164 and 166 bent around the respective leg portions of the clothespin to hold the sheets of copper in operative position thereon, it being understood that the two sheets of copper are spaced from one another so as to be insulated from one another.

The sheets of copper 160 and 162 have reduced end portions 170 and 172 respectively extending at an angle thereto. As seen most clearly in FIG. 6, end portion 170 is bent back upon itself to define a portion 174 extending substantially parallel with portion 170 which in turn terminates in an angularly directed portion 176.

In a similar manner, end portion 172 is bent back upon itself to provide a portion 178 extending substantially parallel with portion 172. Portion 178 in turn joints with an angularly directed portion 180. It is apparent as seen in FIG. 6 that when the contact clip assembly is in operative position, the end portions of the sheets of copper will be urged into electrical contact with the pins 116 and 118 respectively.

As seen most clearly in FIG. 1, copper sheet 160 is connected with an electrical lead 184, while copper sheet 162 is connected with an electrical lead 186. These two leads are in turn connected with a suitable electrical circuit indicated as a rate meter 188 for providing the desired measurement.

It is apparent from the foregoing that there is provided according to the present invention a new and novel drop-count attachment which may be easily mounted about an associated tube with the electrodes thereof piercing the walls of the tube and extending through the tube to be in electrical contact with the contact means of the present invention which in turn is readily accessible for connection with electrical leads through the intermediary of a contact clip assembly and the like. The clamping means swingably mounted on the body means is adapted to tightly clamp the attachment on a tube, and the detent mechanism formed on cooperating portions of the clamping means and the body means serve to hold the clamping means in adjusted position. The attachment is quite simple and inexpensive as well as lightweight and compact in construction, and yet at the same time is quite sturdy and reliable in use.

As this invention may be embodied in several forms without departing from the spirit or essential characteristics thereof, the present embodiment is therefore illustrative and not restrictive, and since the scope of the invention is defined by the appended claims, all changes that fall within the metes and bounds of the claims or that form their functional as well as conjointly cooperative equivalents are therefore intended to be embraced by those claims.

We claim:

1. A drop-count attachment comprising a body means having a recess formed therein for receiving a tube, clamping means supported by said body means for holding the body means in place on a tube, contact means supported by said body means for connecting with electrical lead means, said body means including a tubular portion having a bore formed therethrough, plunger means slidably disposed in said bore in the tubular portion, and a plurality of spaced electrodes supported at one end of said plunger means and movable through said recess and engageable with said contact means.

2. Apparatus as defined in claim 1 wherein said clamping means is swingably mounted on said body means, said clamping means including a resilient finger portion, said body means having ratchet teeth formed thereon and engageable with said finger portion for holding the clamping means in adjusted position.

3. Apparatus as defined in claim 1 wherein said contact means includes a pair of contact pins, said body means including a post portion, said contact pins being supported on opposite sides of said post portion, said contact pins each being connected with a resilient contact portion for receiving one of said electrodes.

4. Apparatus as defined in claim 1 wherein said tubular portion of the body means defines a longitudinally extending slot in communication with said bore formed therethrough, said plunger means having a key on the outer surface thereof slidably disposed within said slot.

5. Apparatus as defined in claim 1 wherein said tubular portion of the body means includes a pair of outwardly extending ears formed at substantially diametrically opposite points thereon, and a cap fitting over the end of said tubular portion, said cap including a peripheral flange having a pair of holes therein for receiving said ears to lock the cap in place on the tubular portion.

6. Apparatus as defined in claim 5 wherein said cap has a hole formed therein for receiving said plunger means, said cap also including a slot in communication with said hole, said plunger means having a key on the outer surface thereof adapted to fit through said last-mentioned slot.

7. Apparatus as defined in claim 1 wherein said plunger means includes a removable tip portion, said electrodes being supported on said tip portion, said tubular portion of the body means having a longitudinally extending slot in communication with the bore formed therethrough, said plunger means and said removable tip portion each including a key formed on the outer surface thereof adapted to fit within said slot.

8. Apparatus as defined in claim 1 wherein said plurality of electrodes comprise three spaced electrodes each of which has a sharp outer end portion for piercing an associated tube, said contact means including resilient contact portions for receiving said electrodes, one of said resilient contact portions comprising a pair of engageable members, the other of said resilient contact portions including two pairs of engageable members.

9. Apparatus as defined in claim 1 wherein said clamping means is swingably mounted on said body means, said clamping means including a resilient finger portion, said body means having ratchet teeth formed thereon engageable with said resilient finger portion for holding the clamping means in adjusted position, said body means including a post portion, said contact means comprising a pair of contact pins extending on opposite sides of said post portion and each of said contact pins being connected with resilient contact portions for receiving said electrodes, said tubular portion of the body means having a longitudinally extending slot formed therein in communication with the bore formed therethrough, said tubular portion including a pair of outwardly extending ears formed thereon adjacent the outer end thereof, a cap fitting over said outer end of the tubular portion, said cap having a peripheral flange including a pair of holes formed therethrough for receiving said ears to lock the cap in place, said cap having a hole formed therethrough for receiving said plunger means, said cap also including a slot in communication with said hole, said plunger means having a key formed on the outer surface thereof, said key adapted to fit through said slot in the cap and being slidably disposed within the slot in the tubular portion, said plunger means including a removable tip portion, said electrodes being supported by said tip portion, said tip portion having a key formed on the outer surface thereof and aligned with the key formed on said plunger means.

10. Apparatus as defined in claim 1 wherein said contact means includes a first contact portion and a second contact portion, said contact portions being adapted for connection in an associated circuit so as to have opposite polarities, said plurality of electrodes including a first pair of electrodes for connection with one of said contact portions so as to be of one polarity relative to an associated circuit, said plurality of electrodes including a third electrode for connection with the other of said contact portions so as to be of opposite polarity relative to an associated circuit.

11. Apparatus as defined in claim 1 including means for preventing removal of said electrodes from operative position when said electrodes have been inserted through an associated tube into engagement with said contact means, thereby preventing removal of the attachment from an associated tube.

References Cited

UNITED STATES PATENTS

| | | |
|---|---|---|
| 2,683,986 | 7/1954 | Bartlett et al. |
| 2,802,083 | 8/1957 | Lapeyre _____ 339—97 X |
| 2,858,518 | 10/1958 | Chrystie et al. _____ 339—118 X |
| 3,218,552 | 11/1965 | Ashmann et al. ___ 324—149 X |

RICHARD C. QUEISSER, *Primary Examiner.*

EDWARD D. GILHOOLY, *Assistant Examiner.*

U.S. Cl. X.R.

324—30, 71; 339—118